(No Model.) 2 Sheets—Sheet 1.

W. A. SWEET.
MACHINE FOR CUTTING TOE CALKS FOR HORSESHOES.

No. 321,659. Patented July 7, 1885.

WITNESSES
INVENTOR (No Model.) 2 Sheets—Sheet 2.
W. A. SWEET.
MACHINE FOR CUTTING TOE CALKS FOR HORSESHOES.
No. 321,659. Patented July 7, 1885.
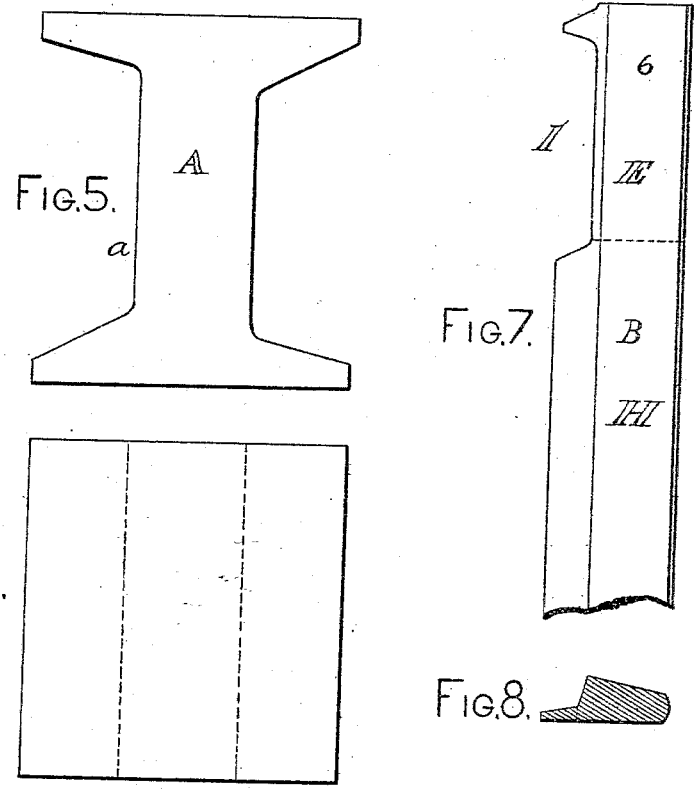
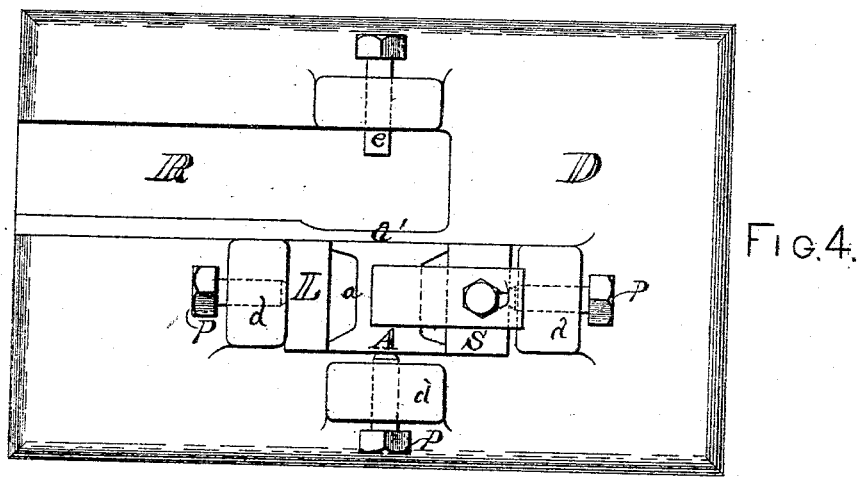
WITNESSES
INVENTOR

UNITED STATES PATENT OFFICE.

WILLIAM A. SWEET, OF SYRACUSE, NEW YORK.

MACHINE FOR CUTTING TOE-CALKS FOR HORSESHOES.

SPECIFICATION forming part of Letters Patent No. 321,659, dated July 7, 1885.

Application filed June 12, 1884. (No model.)

*To all whom it may concern:*

Be it known that I, WILLIAM A. SWEET, of Syracuse, Onondaga county, State of New York, have invented a new and useful Improvement in Machinery for Cutting Toe-Calks for Horseshoes, of which the following is a specification.

My invention relates to the formation, setting, and use of reversible dies and the punches used therewith for cutting the calks, by which their manufacture is cheapened. I attain these objects by the mechanism illustrated in the accompanying drawings, in which—

Figure 3:
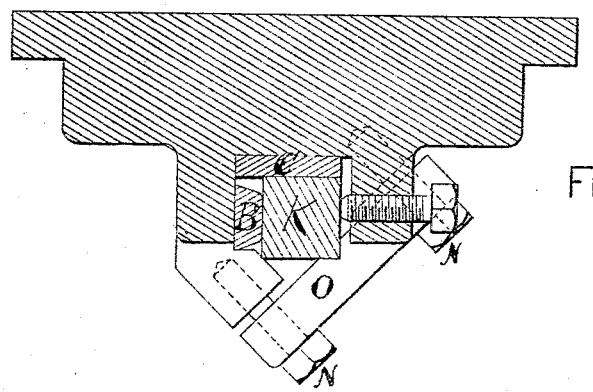
Figure 2:
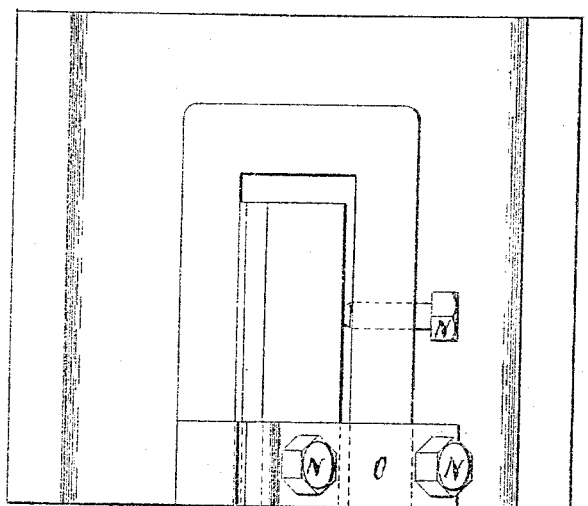
Figure 1:
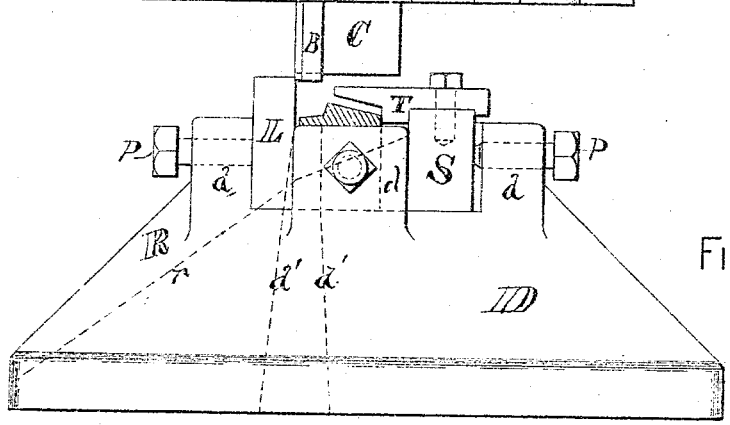

Figure 1 is an elevation of the die-holder; Fig. 2, the punch and punch-holder; Fig. 3, a horizontal section of Fig. 2; Fig. 4, a plan of die and die-holder; Fig. 5, a plan of die A; Fig. 6, an end elevation of die A; Fig. 7, a bar from which toe-calks are cut; Fig. 8, a section of bar H, Fig. 7.

The same parts in the several figures are indicated by like letters.

A is the bed-die for cutting the calks from the bar H and shaping them. This die is formed in its cross-section somewhat like the letter H, as shown at Figs. 5 and 6. Its upper and lower surfaces are straight and parallel, and when dulled by use are ground off flat without changing the configuration of the die until it is ground down too thin for use. The two recesses *a* formed in the sides of this die are exactly alike, so that either of them can be turned to the cutting side, and when the two upper edges are dulled by wear the other end of the die is turned up and presents two more cutting-faces. Thus in a single die are four like cutting-edges, which when dulled are all sharpened by grinding off the ends level. This die is held in a solid die-holder, D, Figs. 1 and 4, cast with projections *d*, between which the die is fixed and adjusted by set-screws P. Beside die A, there is a steel guide-piece, L, on the cutting side, to support and guide the punch B, that slides down beside it as it strikes the inclined surface of bar H to cut in it the notch I. (See Fig. 7.) On the opposite side of the die there is a block, S, held by one of the set-screws P. This has an adjustable "hold down," T, affixed to it by a screw that passes through a slot in T, to adjust it so as to accurately gage and guide the bar H on the die. There is also a stop at *e* to determine the length of the toe-calk cut from the bar. The punch B is formed to fit the recess *a* of die A, and cuts the notch I in bar H. (See Fig. 7.) There is a cut-off punch, C, set at right angles to B, with which it moves up and down, so as to cut off the preceding calk at the dotted line, Fig. 7, just after the notch I is cut in the second calk, and so on, cutting off a calk and forming a recess at each vibration of the punch. The ends of these punches are flat and straight, and are sharpened by grinding them level. They are both held in the sliding head by a block, K, which is clamped in firm contact with them by the cap O (see Fig. 3) and set-screws N N. By loosening these the block and punches can be removed for sharpening and adjustment. When the die and punch are worn by grinding, &c., they can be adjusted in height by metal pieces inserted at the end opposite the cutting end.

In action the punch B, as it descends, clips the piece from the bar at I, which piece falls down through an opening in the die-holder D, as shown by dotted lines *d d*, Fig. 1, after which punch C strikes the bar and cuts off the formed toe-calk at the end of die A at the point shown by the dotted line, Fig. 7, which falls onto an incline, R, (see dotted line *r*,) and slides off. The punches B C are moved up and down by any well-known mechanism, which forms no part of my present invention.

By the above-described construction and arrangement of machinery a calk, E, is cut from the bar H at each downward movement of the punches B C after the bar is trimmed and the first notch, I, formed in it.

Having thus described my invention, I claim as new—

1. The combination of the die A and punches B C to produce the toe-calk herein described, substantially as specified.

2. The double reversible die A, as described, having its opposite sides parallel and so shaped as to have both sides conform to the figure of the toe-calk throughout their length, with flat parallel end, so that either cutting-edge of said die can be used successively for the cutter, substantially as and for the purposes set forth.

3. The combination of the die A, punch B, and guide-piece L, constructed, arranged, and operated as and for the purposes specified.

4. In a machine for cutting toe-calks, as described, the combination of the punches B and C for forming and cutting off toe-calks from a rolled bar, H, constructed and arranged in the manner set forth.

5. The combination of the adjustable punches B C and block K, by which they can be affixed by a cap, O, as described.

W. A. SWEET.

Witnesses:
FRANK G. TALLMAN,
MATTHEW CUNNINGHAM.